2,783,126
METHOD OF RECOVERING ZIRCONIUM OXIDE

Hartmut W. Richter, Rahway, N. J., assignor to Metal & Thermit Corporation, New York, N. Y., a corporation of New Jersey No Drawing. Application October 4, 1954,
Serial No. 460,275

14 Claims. (Cl. 23—18)

This invention relates to the recovery of zirconium oxide ($ZrO_2$) from zirconium salt solutions, and has for its primary object the provision of an improved practical and advantageous process adapted to achieve that end.

A practice of the prior art commonly resorted to for the recovery of zirconium oxide has been to prepare a complex solution of an acidic zirconium salt by dissolving it or a solution of it in an alkali metal carbonate solution and then to boil the resulting solution at atmospheric pressure for an extended period. This has produced a precipitate of zirconium oxide, but the yield has not been entirely satisfactory because a considerable part of the zirconium oxide has remained in solution.

In accordance with the present invention, a complex solution of an acidic zirconium salt is prepared by dissolving it or a solution of it in an alkali metal carbonate solution; zirconium oxide is recovered by subjecting the resulting solution to a temperature considerably above the boiling point of the solution, desirably in a temperature range of 150° C. to 200° C. in a closed vessel for a half hour or more, or until a temperature of 200° C. has been obtained.

The process increases yield over other known methods of precipitation and it leads to $ZrO_2$ in a simple manner. Since the $ZrO_2$ part of the alkali-bearing precipitate is insoluble in dilute acids, the residual alkali is easily removed by an acid leach. This cannot be done with the precipitate which forms on boiling at atmospheric temperature because here the zirconia remains soluble also, hence no easy alkali removal is possible.

While a minimum temperature of 150° C. is necessary for a reasonable yield, the latter is increased substantially at higher temperatures.

Alternatively, the complex solution may be boiled first at atmospheric pressure to yield a precipitate of a zirconium compound. After separation of the precipitate the solution is subjected, without the precipitate, to the autoclave treatment to recover the remainder of the $ZrO_2$ values.

By this procedure one obtains two kinds of zirconium compounds—one that is readily soluble in dilute mineral acid and one (the autoclaved one) which is not.

By way of illustration an example is here given of a process which has been found to work practically and advantageously and to afford a satisfactory yield:

To 870 grams of soda ash ($Na_2CO_3$) dissolved with 1750 ml. of water were added, with good agitation, two liters of a zirconium sulfate solution containing 127 grams per liter of $ZrO_2$ and 215 grams per liter of titratable $H_2SO_4$. The temperature was not allowed to exceed 60° C.

The solution was then transferred to an agitated autoclave and raised therein to a temperature of 200° C. over a period of one hour and 15 minutes. Excess pressure generated by the release of $CO_2$ gas from the solution was relieved by occasional venting through a relief valve. Samples of the autoclave content were taken upon reaching temperature of 200° C. and then ½ hour, 1 hour, and 1¾ hours later. The very first sample showed only very little $ZrO_2$ in the aqueous phase and the subsequent samples were entirely free of zirconium. The precipitate which had formed was filtered on a vacuum filter, washed free of salts and dried at 110 C. It had a total weight of 260 grams and the following analysis:

|  | Percent |
| --- | --- |
| $ZrO_2$ | 87.74 |
| $Na_2O$ | 4.81 |
| $SO_3$ | 0.20 |
| Loss on ignition | 7.37 |
| Total | 100.12 |

The recovery of zirconia was 88%, exclusive of samples. An X-ray diffraction pattern of the unfired material showed broad maxima at values which are characteristic of calcined crystalline zirconia.

The procedure described yields an essentially non-hydrated oxide which is essentially insoluble in dilute sulfuric acid.

I have found that a minimum temperature of 150° C. is necessary for a reasonable yield, but that the yield is increased substantially at higher temperatures. No upper operative temperature limit is known to exist, but since, as the boiling temperature is increased above the atmospheric pressure boiling point the corresponding steam pressure (disclosed by usual steam tables) is correspondingly increased, and there is no substantial increase of yield above 200° C. and no improvement in properties of the product, there is no material advantage in raising the temperature above 200° C.

In the foregoing example, the autoclave treatment was essentially complete by the time the material had attained a temperature of 200° C. There is no known upper operative time limit. Since, however, no substantial gain in yield or properties of the product is realized by continuing the autoclave treatment after a temperature of 200° C. has been attained, such treatment would ordinarily be terminated at the end of that period.

The following additional example shows the invention applied to a chloride, illustrates the influence of time at 150° C., and shows that the yield is substantially improved at 200° C.

To 500 grams of sodium carbonate ($Na_2CO_3$) dissolved with water to a total volume of 2 liters, there was added 1100 ml. of a zirconium oxychloride solution of the following analysis:

|  | Grams/liter |
| --- | --- |
| ZrO | 84.3 |
| Titrable HCl | 48.8 |

The addition of the chloride solution was started at room temperature. The temperature was gradually increased to 55° C. in order to facilitate the re-solution of the precipitate which initially forms upon each fresh addition of zirconium salt solution. After all of the zirconium solution had been added, there remained a very small amount of undissolved percipitate. At this stage the solution had a calculated $ZrO_2$ concentration of 30 grams per liter.

The essentially clear solution was transferred to an agitated autoclave and raised to a temperature of 150° C. which required 20 minutes. A sample was then taken and additional samples were taken at intervals up to a total time of 2 hours after reaching 150° C. The clear liquid phase in each sample analyzed as follows:

|  | $ZrO_2$, g./l. | $ZrO_2$ removed from solution, percent |
| --- | --- | --- |
| On reaching 150° C | 7.4 | 75.4 |
| 30 min. after reaching 150° C | 3.4 | 88.8 |
| 60 min. after reaching 150° C | 2.7 | 90.6 |
| 120 min. after reaching 150° C | 2.6 | 91.4 |

The entire contents of the autoclave were removed and after separating the solids from the liquid phase, the latter was reheated once more but this time to 200° C. As soon as this temperature was reached, which required 25 minutes, heating was discontinued and the contents of the autoclave were discharged. An additional quantity of precipitate had formed and the $ZrO_2$ content of the clear liquor was now 0.4 gram per liter, equivalent to a 98.5% removal of $ZrO_2$ from the solution.

I have described what I belive to be the best embodiments of my invention. I do not wish, however, to be confined to the embodiments shown, but what I desire to cover by Letters Patent is set forth in the appended claims.

I claim:

1. The method of recovering zirconium oxide from a zirconium salt solution which consists in preparing a complex solution of an acidic zirconium salt by dissolving in an alkali metal carbonate solution a material selected from the class consisting of said acidic salt and solutions thereof, and heating the resulting solution to a temperature of at least 150° C. in a closed vessel.

2. The method of recovering zirconium oxide from zirconium salt solutions which consists in preparing a complex solution of an acidic zirconium salt by dissolving in an alkali metal carbonate solution a material selected from the class consisting of said acidic salt and solutions thereof, and heating the resulting solution to a temperature in the range of 150° C. to 200° C. in a closed vessel.

3. The method of recovering zirconium oxide from a zirconium salt solution which consists in dissolving the zirconium salt in an alkali metal carbonate solution, and heating the resulting solution to a temperature of at least 150° C. in a closed vessel.

4. The method of recovering zirconium oxide from a solution of an acidic zirconium salt which consists in preparing a complex solution of an acidic zirconium salt by dissolving it in a solution of soda ash, and heating the resulting solution to a temperature of at least 150° C. in a closed vessel.

5. The method of recovering zirconium oxide from a zirconium salt solution which consists in preparing a complex solution of an acidic zirconium salt by dissolving in an alkali metal carbonate solution a material selected from the class consisting of said acidic salt and solutions thereof, and heating the resulting solution to a temperature of at least 150° C. in a closed vessel while continuously agitating said solution.

6. The method of recovering zirconium oxide from a zirconium sulfate solution which consists in dissolving zirconium sulfate in a solution of soda ash, and subjecting the resulting solution to a temperature of at least 150° C. in a closed vessel.

7. The method of recovering zirconium oxide from a zirconium sulfate solution which consists in dissolving zirconium sulfate in a solution of soda ash at not more than 60° C., and heating the resulting solution to a temperature of at least 150° C. in a closed vessel.

8. The method of recovering zirconium oxide from a zirconium salt solution which consists in preparing a complex solution of an acidic zirconium salt by dissolving in an alkali metal carbonate solution a material selected from the class consisting of said acidic salt and solutions thereof, heating the resulting solution to a temperature of 150° C. in a closed vessel and maintaining it at that temperature for a period of thirty minutes to two hours depending upon the yield desired.

9. The method of recovering zirconium oxide from a zirconium salt solution which consists in preparing a complex solution of an acidic zirconium salt by dissolving in an alkali metal carbonate solution a material selected from the class consisting of said acidic salt and solutions thereof, heating the resulting solution until a temperature of 200° C. is attained, and thereupon discontinuing the heating.

10. The method of recovering zirconium oxide from a zirconium salt solution which consists in preparing a complex solution of an acidic zirconium salt by dissolving in an alkali metal carbonate solution a material selected from the class consisting of said acidic salt and solutions thereof, heating the resulting solution to a temperature in the range of 150° C. to 200° C. and maintaining such temperature from 30 minutes to two hours, according to the yield desired said time and temperature being selected so that when temperatures at the lower portions of said temperature range are employed, longer intervals of time are used, whereas when temperatures at the higher portion of said temperature range are used, shorter time intervals are employed.

11. The method of recovering zirconium oxide from a zirconium salt solution which consists in preparing a complex solution of an acidic zirconium salt by dissolving in an alkali metal carbonate solution a material selected from the class consisting of said acidic salt and solutions thereof, heating the resulting solution to a temperature of at least 150° C. in a closed vessel, whereby said zirconium oxide is precipitated, and recovering the precipitate.

12. A process according to claim 11, wherein said heating of the resulting solution is at a temperature in the range of 150° C. to 200° C.

13. A method according to claim 11, wherein the alkali metal carbonate solution is a solution of soda ash.

14. The method of recovering zirconium oxide from a zirconium sulphate solution which consists in dissolving zirconium sulphate in a solution of soda ash, subjecting the resulting solution to a temperature of at least 150° C. in a closed vessel, whereby zirconium oxide is precipitated, and recovering the precipitate.

References Cited in the file of this patent

UNITED STATES PATENTS

| | | |
|---|---|---|
| 1,454,564 | Ruff | May 8, 1923 |

FOREIGN PATENTS

| | | |
|---|---|---|
| 329,041 | Great Britain | May 15, 1930 |

OTHER REFERENCES

Chemical Abstracts, vol. 45, 1951, page 8419C.